Jan. 26, 1965   M. C. VOSBURGH ETAL   3,167,762
DOPPLER RADAR SYSTEM
Filed April 9, 1959   4 Sheets-Sheet 1
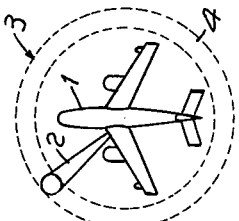
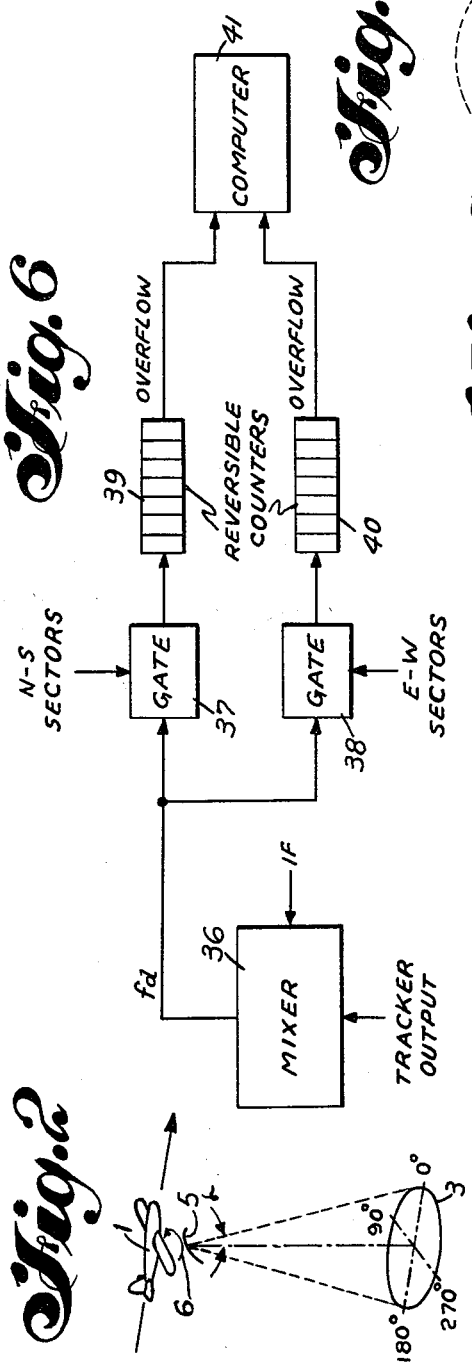
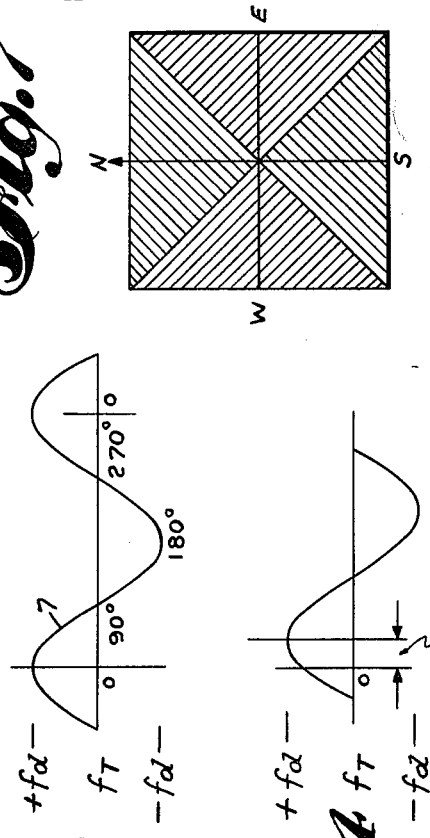
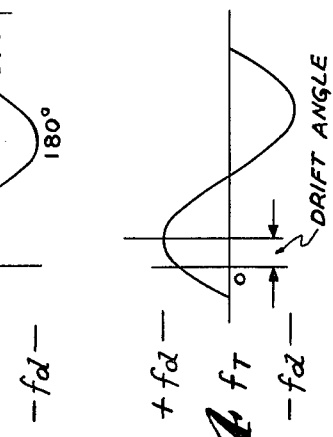
INVENTORS.
MALCOLM C. VOSBURGH
BY JOSEPH MURGIO
ATTORNEY

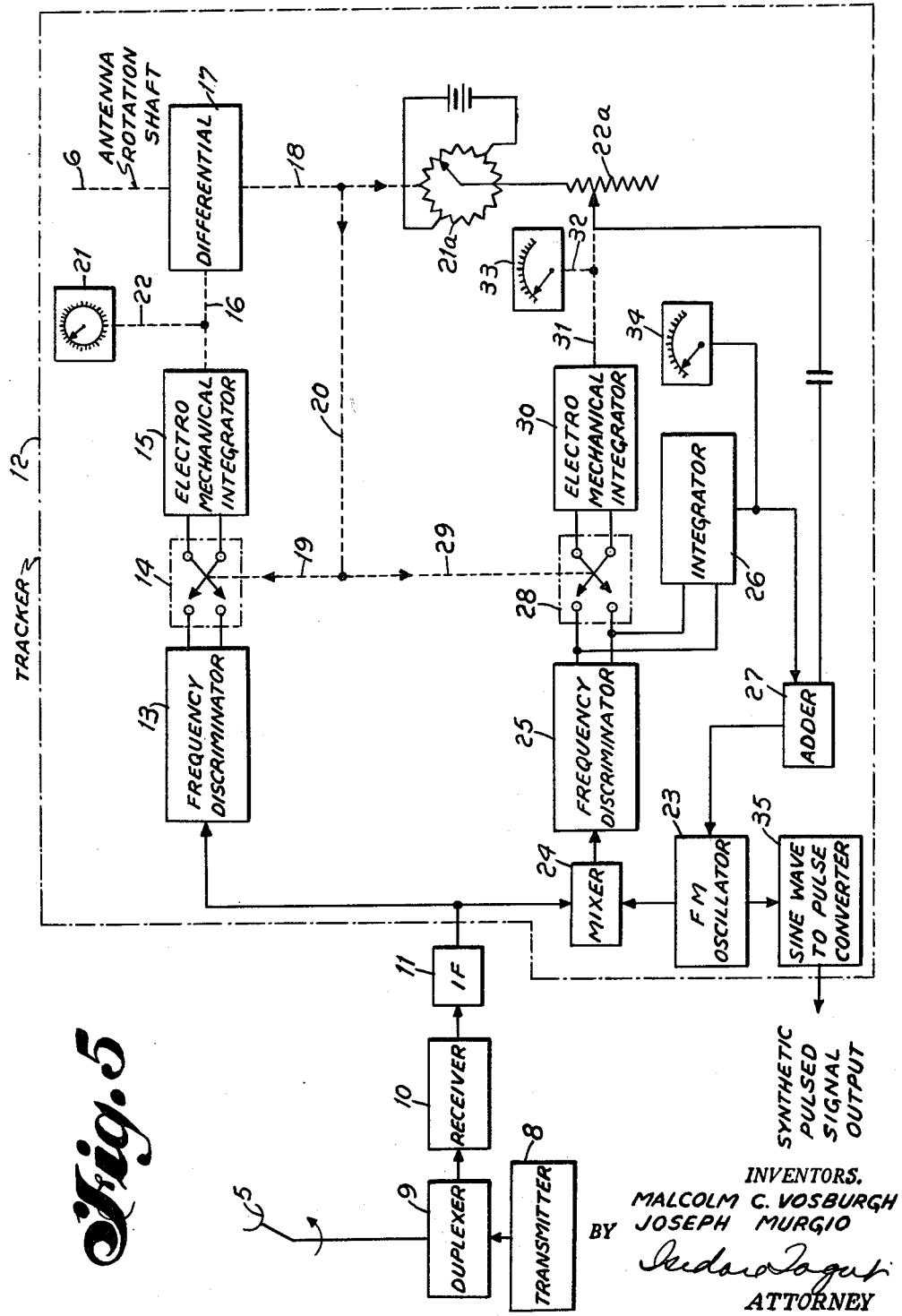

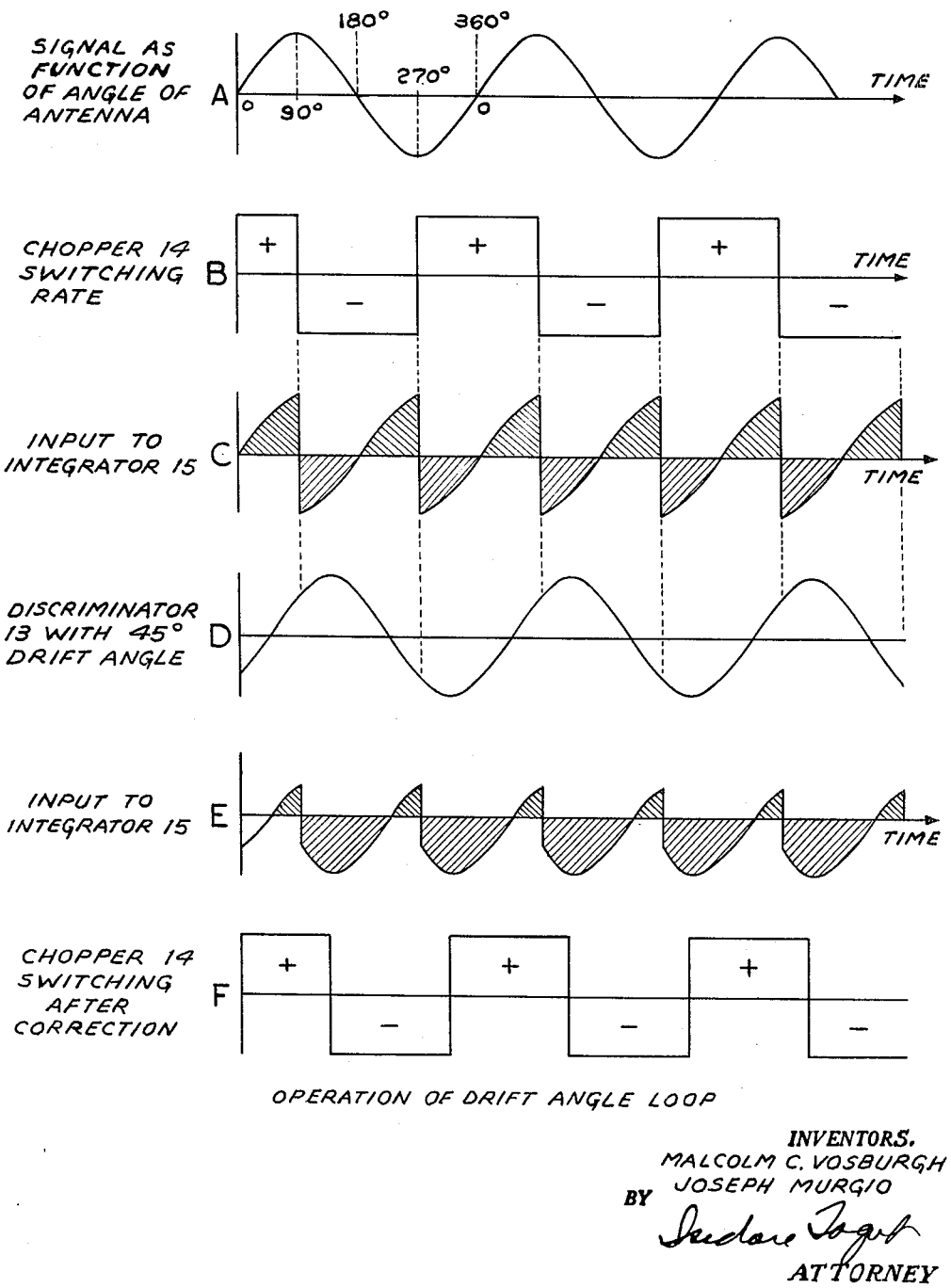

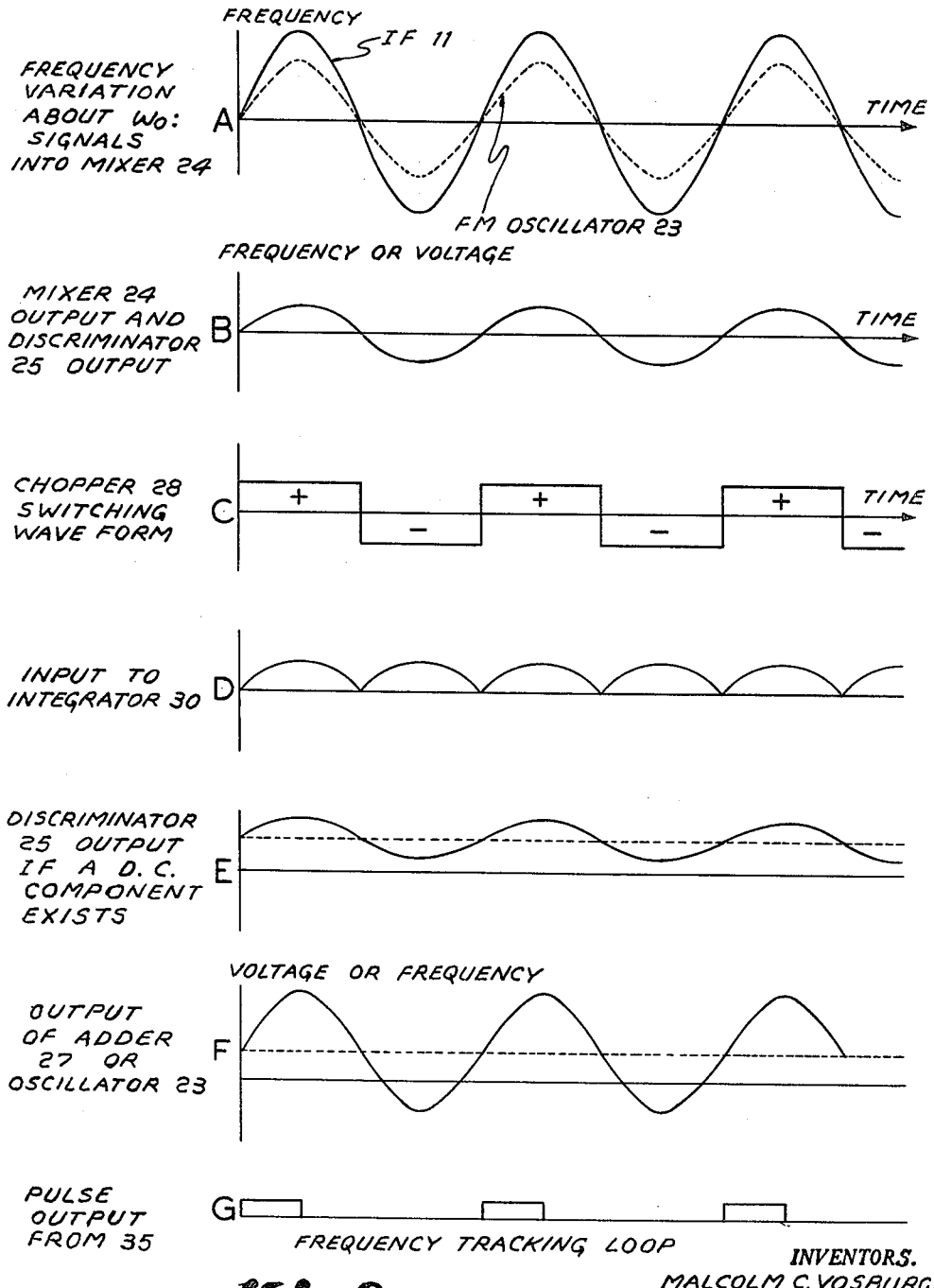

United States Patent Office 3,167,762
Patented Jan. 26, 1965

3,167,762
DOPPLER RADAR SYSTEM
Malcolm C. Vosburgh, Montclair, and Joseph Murgio, Clifton, N.J., assignors to International Telephone and Telegraph Corporation, Nutley, N.J., a corporation of Maryland
Filed Apr. 9, 1959, Ser. No. 805,167
15 Claims. (Cl. 343—9)

This invention relates to doppler radar systems and more particularly to a system which utilizes a circular scan pattern for the transmission of the radio frequency signals.

A number of antenna beam configurations have been successfully used in doppler radar systems. In all cases they consist of a number, two, three, or four, of fixed beams which are simultaneously or sequentially operative. The three and four beam systems employ the so-called Janus principle in which the doppler frequency detected on one beam is compared with that on a similar beam disposed 180 degrees to the first. This Janus technique greatly reduces the antenna stabilization requirements and in the case of coherent Janus systems permits measurement of vertical as well as horizontal velocities. However, precise roll, pitch and vertical velocity information are required in order to extract from the doppler frequencies the horizontal velocity component. By their nature, doppler frequencies are incremental or digital in form. The doppler cycles need only be counted to give the distance traveled without ever having expressed the doppler as a frequency or as a shaft position. The doppler radar systems now in use require extensive frequency tracking equipment and computers to derive the velocity information, the drift angle and the distance traveled. None of these systems utilizes the digital nature of the doppler frequencies to derive information.

It is an object of this invention to provide a doppler radar system having simple and inexpensive antenna system and electronic circuitry and components.

It is another object to provide a doppler radar system which utilizes the digital nature of the doppler frequencies to derive the distance traveled information of the vehicle carrying this system.

A feature of this invention is a doppler radar system for use on board a vehicle to determine the movement and position of the vehicle relative a reradiating element. Radio frequency signals are transmitted in a circular scan pattern by a rotating beam antenna, the axis of which is offset from the axis of rotation. Intermediate frequency signals are derived from the received signals including the doppler frequency which contain the movement and position information of the vehicle relative the reradiating element. The received doppler frequency signal is a sine wave of frequency centered about the frequency of the transmitted radio frequency signal.

Another feature is the provision of a frequency tracker to which are coupled the intermediate frequency signals. The frequency tracker includes means to determine the drift angle of the vehicle from the phase difference between the received doppler frequency signal and the antenna rotation.

Still another feature is that the frequency tracker includes means to determine the amplitude of the received doppler frequency signal and means operating in accordance with said determined amplitude to derive the velocity of said vehicle.

A further feature is that the system further includes means to synthesize intermediate frequency signals including the doppler frequency signal which are equal in frequency and phase to the derived intermediate frequency signals. These synthesized intermediate frequency signals are then converted into pulse signals and means are provided to derive from these converted pulse signals the distance traveled information of the vehicle.

These and other objects of this invention will become more apparent by reference to the following description taken in conjunction with the accompanying drawings, in which:

FIG. 1 is an illustration of an aircraft utilizing the circular scan concept of this invention;

FIG. 2 is an illustration showing the projection of the circular scan radar beam on the ground;

FIG. 3 is a waveform which shows the received doppler frequency signal as a sine wave of frequency centered about the transmitter frequency when there is no drift angle;

FIG. 4 is a waveform showing the received doppler frequency signal when there is a drift angle;

FIG. 5 is a block diagram of the tracker of this invention for use with circular scan;

FIG. 6 is a block diagram of the circuitry used in the determination of the distance traveled from the output of the tracker;

FIG. 7 is a diagram of the scanning sectors for gating the pulse signals;

FIG. 8 is a graph of waveforms describing the operation of the drift angle loop; and FIG. 9 is a graph of waveforms describing the operation of the frequency tracking loop.

If a single pencil radar beam is allowed to scan about the vertical at a constant angular velocity and with a constant depression angle, it will trace out a circle on a plane earth beneath. Referring now to FIGS. 1, 2, 3 and 4, there is shown an aircraft 1 transmitting a radar beam 2 in a circular scan pattern 3. The radiated area 4 is an annulus whose width is determined by the width of the radar beam. The scanning antenna (not shown) may be of any of the conventional types of radar antenna used on board aircraft, such for example, as a parabolic reflector antenna 5 shown in outline form in FIG. 2. The axis of the antenna 5 is off-set from axis 6 at an angle α and rotated about the axis 6 to produce the circular scan 3. The received doppler frequency will be a sine wave of frequency variation 7, centered about the transmitter frequency with a peak-to-peak amplitude twice that of the doppler frequency which would be received by a fixed beam of the same depression angle and pointing in the direction of the velocity vector. The sine wave variation 7 is a variation of the instantaneous frequency. The received doppler frequency varies ("shifts") its frequency above or below the transmitter frequency in a way that varies sinusoidally in time. For example, the frequency at some time during the circular scan may be, for example, 10% higher than the transmitter frequency; later it may be 10% lower. This is referred to as frequency variation and is a function of the doppler effect, direction of point of the scanned beam and the depression angle. Peak-to-peak amplitude means the peak-to-peak values of frequency variation (or shift). Hence, it is a measure of the magnitude of the horizontal velocity. The phase of this sine wave 7 of frequency differs from the phase of the antenna rotation angle with respect to the air frame by the drift angle. Since this phase difference can have all values between zero and 360 degrees, the system is obviously unlimited with respect to drift angle and is particularly advantageous for helicopter use. The rate of frequency change or the change in doppler frequency is at the maximum when the antenna is at the 0° or 180° position and is at a minimum when the antenna is at 90° or 270° position. In FIG. 3, the received doppler signal of frequency variation is shown in an ideal case where there is no drift angle. Therefore, at zero degrees and 180 degrees the maximum peak signal of doppler frequency is obtained. However, if there is a drift angle then the received signal will be such as shown in FIG. 4 where the peak amplitude of the doppler frequency variation is attained after zero degrees by the amount of the drift angle. If the signal to noise ratio were always high, that is, no gaps or drop outs in the signal return, it would be possible to count the doppler cycles directly without benefit of frequency tracking and also directly extract horizontal and vertical distances traveled. However, in the radio and radar world we can never count on such continuity and therefore our first requirement is to track the sine wave of doppler frequency variation. Tracking refers to the generation of a synthetic frequency which follows the center of the doppler spectrum and based on memory and anticipation continues to develop the proper frequency even in the presence of fades and drop outs. There are a number of trackers already developed which search out and track the center of a slowly changing doppler spectrum. However, there has not yet been developed a tracker for tracking a spectrum which is varying sinusoidally (and passing through zero) at a one-to-ten cycle rate such as the spectrum of this system will do.

With reference to FIG. 5, there is shown a block diagram of such a tracker. There are two aspects of the problem. First, the phase of the sine wave 7 with respect to the antenna rotation must be determined in order to indicate the drift angle. Secondly, the magnitude of the variations of the doppler frequency (which is known to be sinusoidal and at the antenna scan rate) must be tracked. The two sine waves must be brought into phase coincidence before the tracking in amplitude of the doppler frequency variation can be accomplished. The transmitted signal is fed from the transmitter 8 via the duplexer 9 and the antenna 5. The received reradiated signal after transmission is received via the antenna 5 and duplexer 9 and detected in the receiver 10 which may be any conventional receiver or sensor used in existing doppler radar systems. The output of the receiver is fed into an intermediate frequency amplifier 11 and the output of the intermediate frequency amplifier, which is the sinusoid of doppler frequency variation 7 superimposed upon an intermediate frequency enters the tracker 12 and is coupled to a frequency discriminator 13. The output of the frequency discriminator 13 is fed into a mechanical chopper 14 where the phase reversal of the signal is accomplished at the rate of the antenna rotation. The output of the chopper 14 is then fed into an integrator 15 which is of the electromechanical type, such as for instance, shown on page 252 of volume 20 of the Radiation Laboratory Series "Electronic Time Measurements." Any phase difference that exists between the phase of the sinusoid 7 and the phase of the antenna shaft 6 rotation will be thus translated into an error voltage which will drive the shaft 16 which is connected to an input of a differential 17. The antenna rotation shaft 16 is coupled to the other input of the differential 17. The difference then between the inputs to the differential 17 will rotate the output shaft 18 which is coupled to the shaft 19 of the chopper 14 by linkage 20 to correct the output shaft 18 rotation to be in phase with the intermediate frequency signal. That is to say, the antenna shaft is coupled differentially in such a way that the differential output thereof is forced into phase synchronism with the sine wave from the discriminator 13. The shaft 16 is coupled to a meter 21 by means of a shaft 22 to give an indication on the meter of the drift angle of the aircraft. In this manner, differential output shaft 18 rotation is now brought into phase synchronism with the received signal. As described above, the sinusoidal frequency variation that is present on the return signal is applied to the frequency discriminator 13. Waveform A, shown in FIG. 8 indicates the sinusoidal variation in output of 13 due to the rotation of the antenna. The switching operation of chopper 14 is shown in waveform B of FIG. 8. This chopper simply reverses the sign of the discriminator output and feeds it into the electromechanical integrator 15. Synchronism with the antenna rotation is obtained by having the shaft 19 operate the chopper. It must be noted however, that a 90° phase shift exists always between the antenna angle waveform and the square wave operation of chopper 14. In other words, a sign reversal is obtained only when the angle of the antenna, as reflected thru shaft 19 is at a 90° or 270° point. Waveform C indicates the resulting input to integrator 15. Because of the phase shift that exists between A and B, the waveform C is balanced in its positive and negative contributions, to the integrator. This waveform when integrated over a long period has a zero integral; hence, no rotation of shaft 16 into the differential 17 takes place. This is correct since we have postulated no drift angle.

Waveform D depicts the discriminator 13 output when a 45° drift angle exists in the aircraft's motion. If no rotation of shaft 16 had occurred from the previous case, no phase shift in the antenna angle would be introduced by the differential 17. The chopper 15 would still operate according to waveform B. In this case, waveform E indicates the new input to integrator 15. It can be seen that this waveform is not symmetrical about the time axis and hence will have a non-zero integral. The integration by 15 of this waveform rotates shaft 16 introducing thru the differential 17, a phase angle equal to the drift angle. This realigns the chopper 14 waveform to look as shown in F. The input to integrator 15 now will look similar to waveform C but shifted 45° in antenna angle. In this manner, the loop nulls to a shaft 16 position to compensate for the drift angle.

It is now necessary to track in amplitude. The in phase shaft 18 is coupled to a sine potentiometer 21a or other sine generator whose output is applied by means of an amplitude control variable potentiometer 22a to an oscillator 23 whose frequency is centered around the IF frequency and is linearly controlled by the output of the potentiometer 22a. The voltage output of the sine potentiometer 21a is proportional to the angular position of the antenna and is in phase with the intermediate frequency signal. The voltage output of the potentiometer 22a is a sinusoid whose amplitude is proportional to the received sine wave of Doppler frequency variation. This A.C. voltage when applied to the FM oscillator 23 will then tune it to the sinusoid 7 of Doppler frequency variation which is the IF signal input to the tracker 12. The oscillator 23 is tuned about the intermediate frequency and its frequency is linearly controlled by the voltage output of the potentiometer 22. The output of the FM oscillator is coupled to a mixer 24 to which is also coupled the output of the IF amplifier 10. The output of the mixer 24 is coupled to a second frequency discriminator 25 whose output is a constant voltage indicative of any frequency difference that may exist between the outputs of the intermediate frequency amplifier 10 and the oscillator 23. The output of the frequency discriminator 25 is coupled to an integrator 26 to produce as the output thereof a D.C. voltage which is indicative of any frequency difference that may be present between the respective outputs of the intermediate frequency amplifier 10 and the oscillator 23. This D.C. voltage output is added to the A.C. voltage output of the potentiometer 22a in the summing amplifier 27 which when fed into the oscillator 23 will correct the frequency of the oscillator to be in phase and frequency synchronism with the output of the intermediate frequency amplifier 11. The output of the frequency discriminator 25 is also fed into a second mechanical chopper 28 where the phase of the discriminator output is reversed at the antenna rotation rate by means of the shaft 29 which is coupled to the linkage 20. The output of the chopper is then fed into a second electromechanical integrator 30 similar in operation to the integrator 15 and will produce an error voltage output when the sine wave of the frequency discriminator output is not in synchronism with the antenna rotation rate. This error voltage will drive the output shaft 31 of the electromechanical integrator 30 and thereby move the wiper arm 32 of the potentiometer 22a to vary the amplitude of the sine output of the sine potentiometer 21a. The output shaft 31 of the integrator 30 thus controls the magnitude of the sine wave input to the FM oscillator 23. The magnitude of the sine wave input to the FM oscillator from the potentiometer 22a is proportional to the amplitude of the sinusoidal Doppler frequency variation signal. When the magnitude of the sine wave input or the voltage input to the FM oscillator is at the level where it is proportional to $f_d$, then the rotation of the shaft 31 will cease. A shaft 32 is coupled to shaft 31 and in turn is connected to the indicator of a velocity indication meter 33 that displays the velocity or ground speed of the aircraft 1. The output of the discriminator 26 is also connected to a meter 34 which indicates the vertical velocity of the aircraft. In the case of an aircraft flying straight ahead, the vertical velocity is a negligible factor. This indication of vertical velocity, however, is important for helicopters and VTOL aircraft. In the presence of a vertical velocity component, the received Doppler frequency variation is still a sine wave of frequency, but it is no longer centered about the IF frequency. The zero frequency level has been shifted upward by the amount of the D.C. voltage output of the integrator 26 which is an indication of the vertical velocity of the aircraft. This, of course, assumes that the oscillator 23 has no drift, for then the D.C. output of the integrator would be entirely the measure of vertical velocity. However, even with drift present in the oscillator, because of the closed loop which acts as an error signal for the vertical velocity determination, the error for vertical indication could be reduced to a small percentage.

When the oscillator 23 has been synchronized in phase and frequency with the IF signal, the output of the oscillator is now a synthesized replica of the IF signal and may be processed into position data. In the event of signal drop out, the FM oscillator depending on shaft memory will continue to develop the same synthetic signal it was putting out at the moment of drop out. The outputs of the FM oscillator are fed into a sine wave to pulse converter 35, where the sine wave output of the oscillator which contains the signals IF plus $f_d$ is converted into a pulse train having a pulse repetition rate of the same frequency. FIGURE 9 shows the frequency variation about some center frequency, $\omega_0$, of the IF output (solid line) and the FM oscillator (dotted line). The frequency difference causes an output of mixer 24 as shown in waveform B. The output of frequency discriminator 25 is similar to B. Waveform C indicates the chopper 28 switching rate. It is in synchronism with the drift angle corrected antenna shaft rotation. It is to be noted that no extra phase shift is introduced. The resultant chopper output is shown in D as it is fed into the integrator 30. This waveform is used as an error signal and its integration turns shaft 31 to control the variation of oscillator 23. This action nulls the loop making oscillator 23 output more nearly equal to the IF frequency shown in waveform A. As the input to integrator 26 is from the discriminator 25 and is not chopped, integrator 26 has a zero-integral. A vertical velocity will add a D.C. component to the mixer output. Waveform E indicates the discriminator 25 output if a D.C. component exists. This waveform would then have a non-zero integral when integrated by device 26, although this D.C. component would not effect integrator 30. The output from 26 is added thru device 27 to the sinusoidal signal generated by potentiometers 21a, 22a. Waveform F shows the resultant waveform that would be applied to oscillator 23, assuming a vertical velocity but no drift.

The frequency variation of the oscillator output is similar. Waveform G shows a typical output of converter 35 assuming that it is designated to give one pulse per cycle of the sinusoidal output of oscillator 23. With reference to FIG. 6 the pulse train output of the converter 35 is coupled to the input of a mixer 36 to which is also coupled an IF pulse signal equivalent to the IF pulse signal of the FM oscillator output. In the mixer 36 the IF is subtracted from the tracker output to produce the Doppler frequency pulse signals which are increments of position.

In the Doppler frequency sine wave the frequency of the sine wave is proportional to the velocity. Therefore each cycle is proportional to the distance traveled during that period. Each pulse which is derived from a cycle therefor is an indication of the distance traveled during the period. It is now necessary to make a resolution of the information into its proper segments. To obtain north distance travel, it is only necessary to gate the tracker output after the IF frequency has been removed with positive sign into a smoothing counter while the beam scans the 90-degree sector centered about the north direction as shown in FIG. 7 and with a negative sign while the beam scans the 90-degree sector centered about the south direction. Another counter with similar gating about the east and west segments obtains the east distance travel. The IF, as said before, is subtracted from the tracker output. The difference of the two is then applied to the two gates 37 and 38. These gates are opened during the scanning of the appropriate sectors to pass the pulse Doppler frequency signals to two reversible counters 39 and 40. The two reversible counters 39 and 40 smooth out the data input. The resultant output of the reversible counters 39 and 40 or the overflow is fed into a computer 41 such as the CP-340/APN-105 Computer made by Laboratory for Electronics Inc., Boston, Mass., which will calculate the distance traveled information for the aircraft.

While we have described above the principles of our invention in connection with specific apparatus, it is to be clearly understood that this description is made only by way of example and not as a limitation to the scope of our invention as set forth in the objects and in the accompanying claims.

We claim:

1. A doppler radar system for use on board a vehicle to determine the movement and position of said vehicle relative a reradiating element comprising a source of radio frequency signals, means to transmit said signals in a circular scan pattern toward said element, means to receive reradiated signals from said element, means to derive intermediate frequency signals from said received signals containing the doppler frequency signals, means to derive from said doppler frequency signals the movement information of said vehicle relative said reradiating element, means to derive from said intermediate frequency signals including said doppler frequency signals digital signals and means to derive from the digital doppled signals the position information of said vehicle relative said reradiating element.

2. A doppler radar system according to claim 1 wherein the received doppler frequency signals vary to form a sine wave of frequency variation centered about the frequency of the transmitted radio frequency signal.

3. A doppler radar system according to claim 2 wherein said means to derive the movement and position information from said intermediate frequency signals include a frequency tracker.

4. A doppler radar system according to claim 3 wherein said system includes a beam radiating antenna adapted to rotate about a given axis offset from the axis of said antenna, and said circular scan pattern is produced by rotation of said antenna about said given axis.

5. A doppler radar system according to claim 3 wherein said frequency tracker includes means to determine the phase of said received doppler frequency sine wave relative the phase of said antenna rotation for determination of drift angle, means to determine the amplitude of said doppler sine wave of frequency variation and means operating in accordance with said determined phase and amplitude of said received doppler sine wave of frequency variation to synthesize signals equal in frequency and phase of said received doppler frequency sine wave relative doppler frequency signals.

6. A doppler radar system according to claim 5 wherein said means to determine the relative phase of said received doppler sine wave of frequency variation comprise a first frequency discriminator, a differential, means coupling the rotation shaft of said antenna to an input of said differential, a first mechanical chopper, means coupling the output shaft of said differential of said mechanical chopper, means coupling the output of said first frequency discriminator to the input of said chopper, a first electromechanical integrator, means coupling the output of said chopper to said first electromechanical integrator and shaft means coupling the mechanical output of said first electromechanical integrator to the second input of said differential whereby the phase difference between the received doppler sine wave of frequency and the rotation rate of said output shaft of said differential produces an error rotation input to said differential to correct the rotation phase of said output shaft to be in coincidence with said phase of said received doppler sine wave of frequency.

7. A doppler radar system according to claim 6 wherein a display device is coupled to said shaft means coupling the mechanical output of said electromechanical integrator to said differential to display the angular displacement of said shaft as an indication of the phase difference between said received doppler sine wave of frequency variation and the said antenna shaft rotation, said indication denoting the drift angle of said vehicle.

8. A doppler radar system according to claim 6 wherein said amplitude determining means comprises a mixer, an oscillator tunable to generate signals equal to the intermediate frequency signals including doppler frequency signals coupled to said mixer, means coupling said intermediate frequency signals to said mixer, a second frequency discriminator coupled to the output of said mixer, a second mechanical chopper, means coupling the output shaft of said differential to said second mechanical chopper, means coupling the output of said second frequency discriminator to the input of said second chopper, a second electromechanical integrator, means coupling the output of said chopper to said second electromechanical integrator, a sine potentiometer, means coupling said output shaft to said sine potentiometer, a variable resistor, means coupling the output of said sine potentiometer to said variable resistor, shaft means coupling the mechanical output of said second electromechanical integrator to the movable contact arm of said variable resistor, means coupling the output of said variable resistor to said oscillator whereby the said oscillator is tuned to the frequency of the said intermediate frequency signals.

9. A doppler radar system according to claim 8 wherein a display device is coupled to said shaft, means coupling the output of said second electromechanical integrator to said movable arm of said variable resistor to display the angular displacement of said shaft as an indication of the amplitude coincidence of said oscillator signal with said intermediate frequency signals including said doppler frequency signals denoting the velocity of said vehicle with reference to said reradiating element.

10. A doppler radar system according to claim 9 wherein said frequency tracker further includes an integrator, means coupling the output of said frequency discriminator to said integrator, an adder, means coupling the output of said integrator and said variable resistor to said adder, means coupling the output of said adder to said oscillator for tuning said oscillator to the frequency of the derived intermediate frequency signals including the received doppler frequency signal and for maintaining the output of said oscillator in frequency synchronism with said intermediate frequency signals.

11. A doppler radar system according to claim 10 wherein said output of said integrator is coupled to a display device and said integrator output is proportional to the vertical velocity of said vehicle relative said reradiating element.

12. A doppler radar system for use on board a vehicle to determine the movement and position of said vehicle relative a reradiating element comprising a source of radio frequency signals, means to transmit said signals in a circular scan pattern, means to receive the reradiated signals from said element wherein the received doppler frequency is a sine wave of frequency variation centered about the transmitted radio frequency signal frequency, means to derive intermediate frequency signals from said received signals containing the doppler frequency, means to synthesize signals equivalent in frequency and phase to said intermediate frequency signals including said doppler frequency signal, means to convert said synthesized intermediate frequency signals including the doppler frequency into pulse signals wherein each pulse is equivalent to each cycle of said intermediate frequency signals, means to derive from said doppler frequency the drift angle and vertical and horizontal velocities of said vehicle relative said reradiating element and means to derive from said pulsed doppler frequency signals the distance traveled of said vehicle.

13. A doppler radar system according to claim 12 wherein said means to derive the distance traveled include means to count the doppler frequency pulses received during discrete azimuthal portions of said circular antenna scan.

14. A doppler radar system according to claim 13 wherein said means to derive the distance traveled further include gating means responsive to said circular scan whereby said counting means derives pulse counts indicative of the distance traveled by said vehicle in the north-south sectors and the distance traveled in the east-west sectors.

15. A doppler radar system for use on board a vehicle to determine the movement and position of said vehicle relative a reradiating element comprising a source of radio frequency signals, a beam antena adapted to rotate about a given axis offset from the axis of said antenna and to produce a circular scan pattern by rotation of said antenna, means to transmit said radio frequency signals in said circular scan pattern, means to receive the reradiated signals from said element wherein the received doppler frequency is a sine wave of frequency variation centered about the transmitted radio frequency signal frequency, means to derive intermediate frequency signals from said received signals containing the doppler frequency, means to derive the drift angle of said vehicle from the phase difference between the received doppler sine wave of frequency variation and the antenna rotation rate, means to derive the velocity of said vehicle relative said element from the amplitude of said received doppler sine wave freqency variation, means responsive to said phase difference and said amplitude to synthesize signals equivalent in frequency and phase to said intermediate frequency signals including the doppler frequencies, means to convert said synthesized signals into pulse signals having a pulse repetition rate equivalent to the frequency of said synthesized signals, a mixer, a source of pulse signals having a pulse repetition rate equivalent to the frequency of the intermediate frequency signal, means coupling said synthesized signals and said source of pulse signals to said mixer to derive an output of pulse signals, the pulse repetition rate thereof being equivalent to the doppler frequency, first and second gating means coupled to the output of said mixer, said first gating means being adapted to pass the signal output of said mixer where said antenna scans two diametrically opposite 90 degree angular sectors centered about the north-south axis, said second gating means being adapted to pass the signal output of said mixer when said antenna scans the two diametrically opposite 90 degree angular sectors centered about the east-west axis, first and second reversible counters, means coupling the output of said first gate to said first counter, means coupling the output of said second gate to said second counter, a computer, means coupling the overflow outputs of said first and second counters to said computer to derive as the output of said computer the distance traveled of said vehicle.

References Cited in the file of this patent

UNITED STATES PATENTS

| | | |
|---|---|---|
| 2,853,700 | Cherry | Sept. 23, 1958 |
| 2,986,729 | Walker | May 30, 1961 |
| 3,045,232 | Mercer | July 17, 1962 |